Sept. 8, 1925.
W. S. MAYERS
1,552,941
INITIAL HEAT LEER AND AUTOMATIC FEEDING EQUIPMENT
Filed Sept. 25, 1920   4 Sheets-Sheet 1
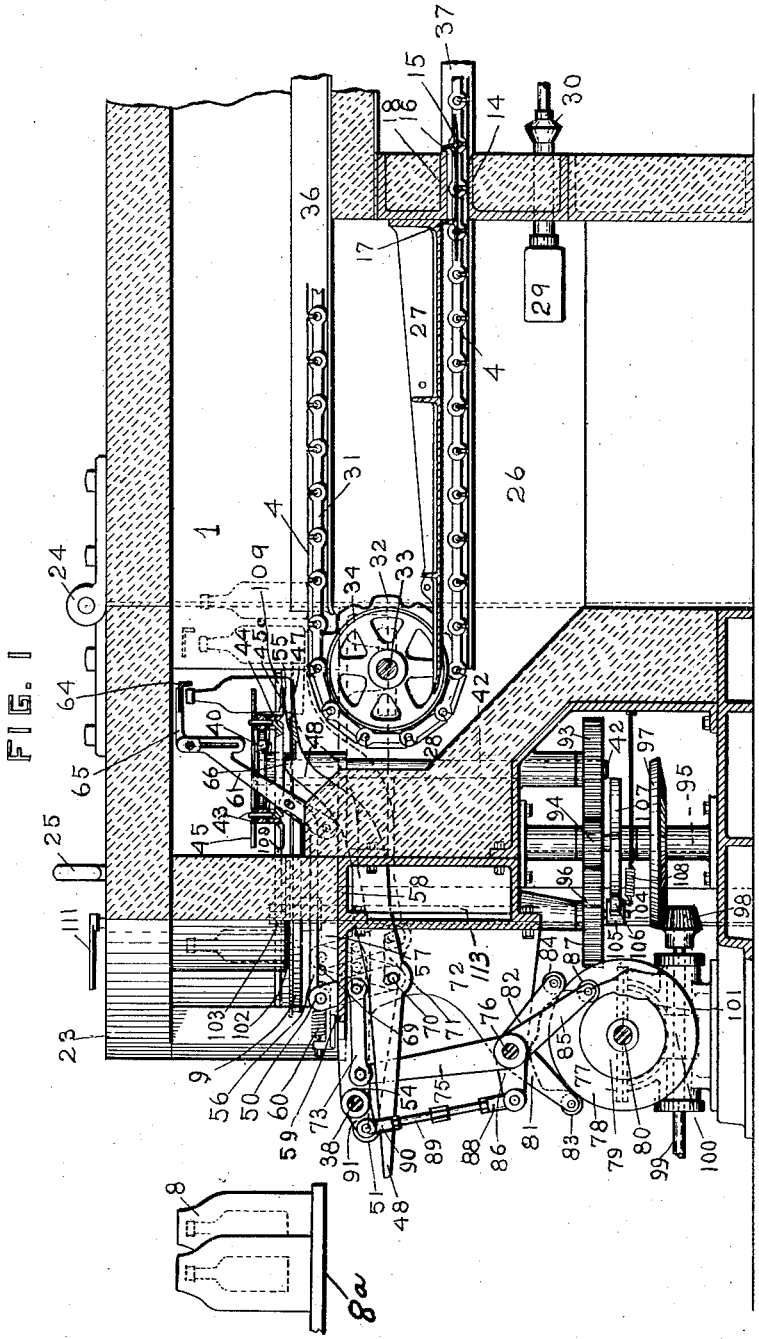
Witnesses
L. N. Loveland
Walter R. Sterrett
Inventor
Wilbur S. Mayers Sept. 8, 1925.
W. S. MAYERS
1,552,941
INITIAL HEAT LEER AND AUTOMATIC FEEDING EQUIPMENT
Filed Sept. 25, 1920 4 Sheets-Sheet 2
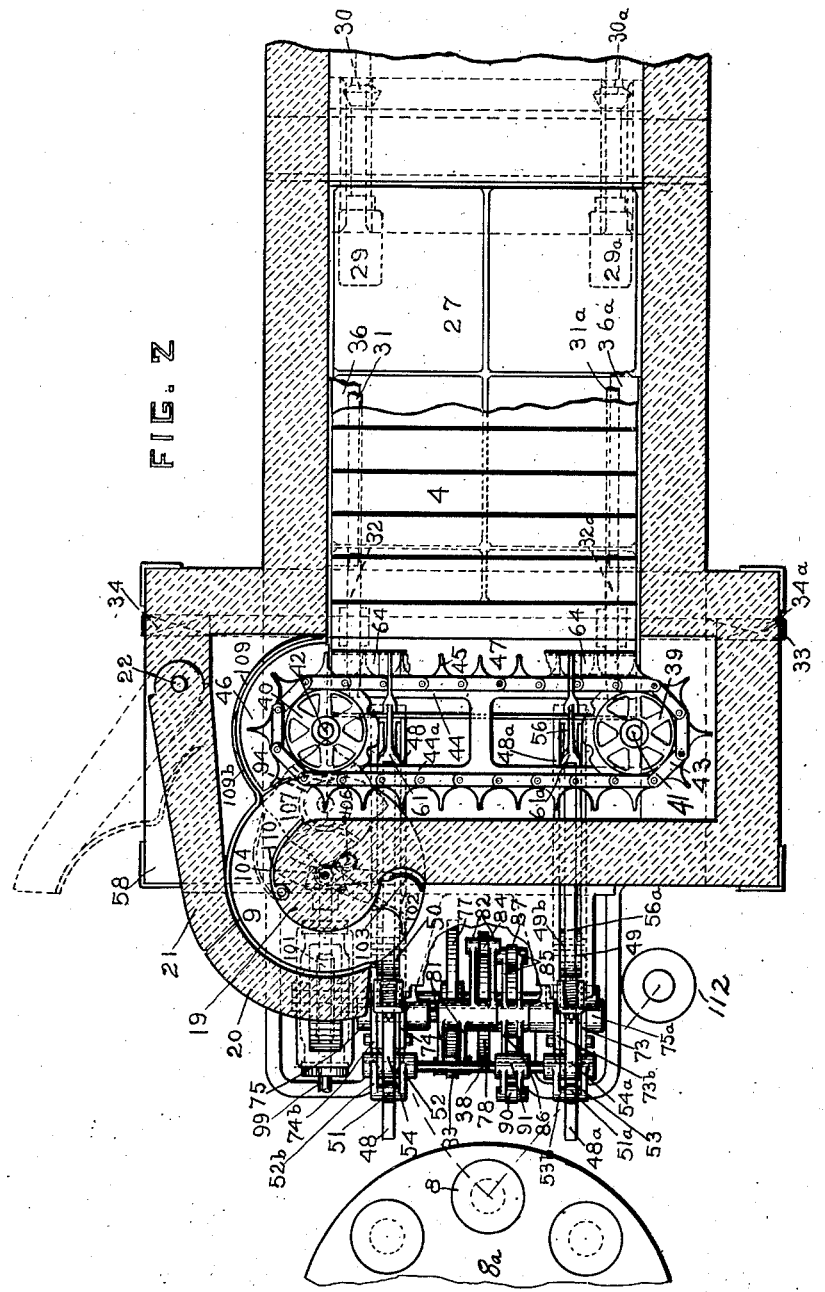
Witnesses
D. N. Loveland
Walter R. Sterrett
Inventor
Wilbur S. Mayers.

Sept. 8, 1925. 1,552,941
W. S. MAYERS
INITIAL HEAT LEER AND AUTOMATIC FEEDING EQUIPMENT
Filed Sept. 25, 1920 4 Sheets-Sheet 3
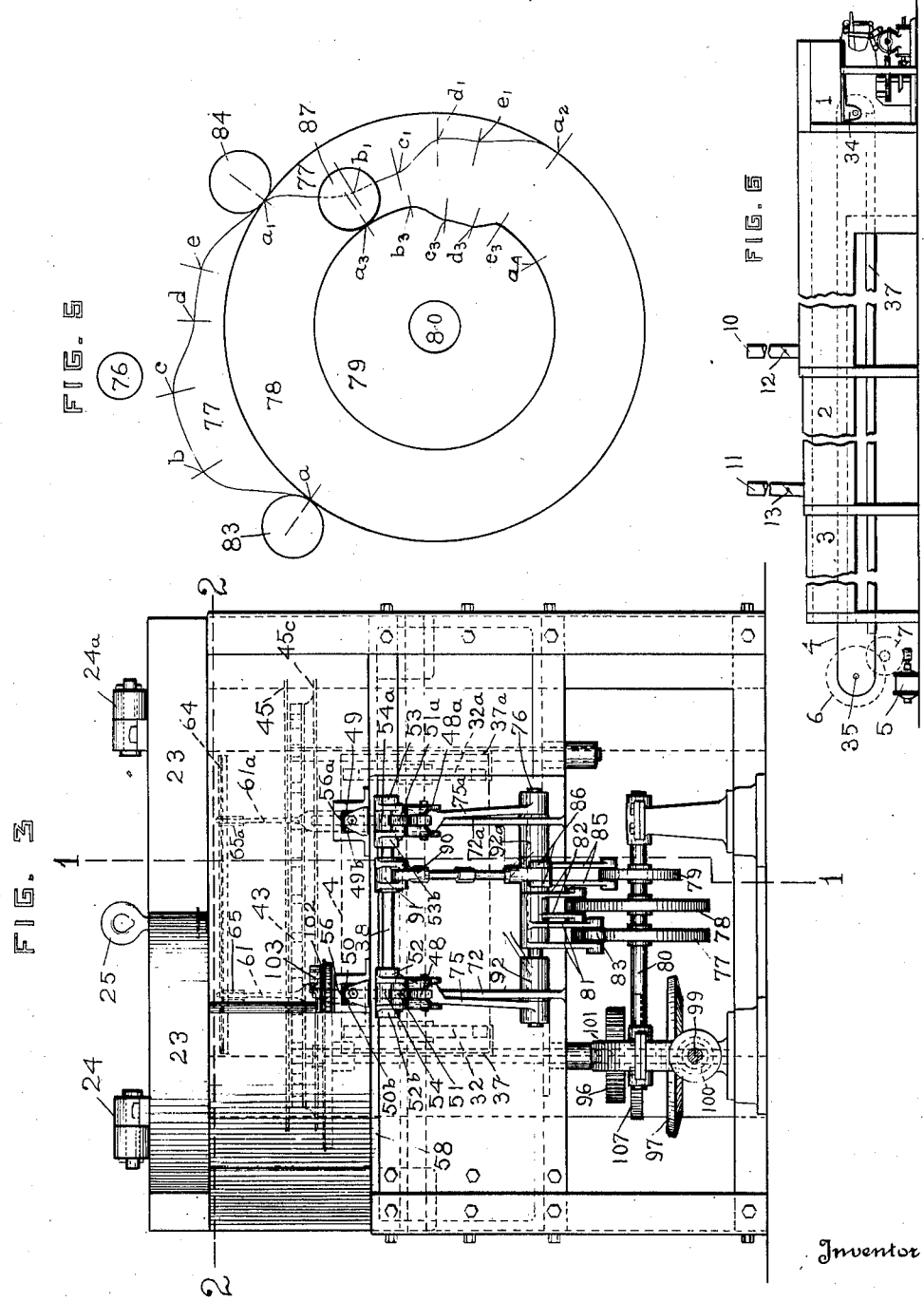

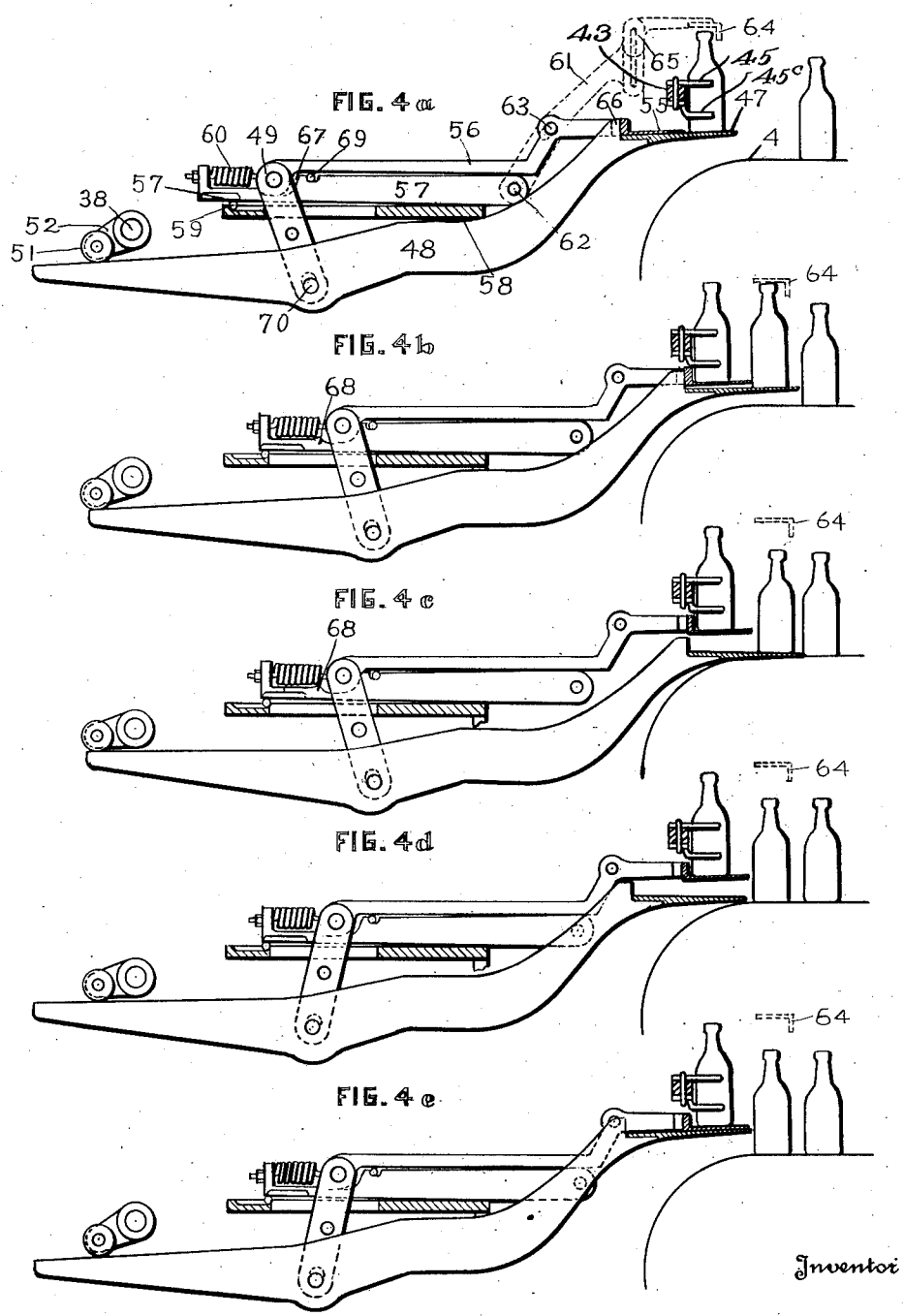

Patented Sept. 8, 1925.

1,552,941

UNITED STATES PATENT OFFICE.

WILBUR S. MAYERS, OF FAIRMONT, WEST VIRGINIA.

INITIAL-HEAT LEER AND AUTOMATIC FEEDING EQUIPMENT.

Application filed September 25, 1920. Serial No. 412,710.

*To all whom it may concern:*

Be it known that I, WILBUR S. MAYERS, a citizen of the United States, residing at Fairmont, in the county of Marion and State of West Virginia, have invented new and useful Improvements in Initial-Heat Leers and Automatic Feeding Equipment, of which the following is a specification.

My invention relates to annealing chambers and automatic feeders used in glass manufacturing plants for such articles as bottles, tumblers, packing jars and the like. Heretofore the annealing of these articles has been done in furnaces and chambers requiring a large amount of fuel for reheating the ware and several hours for the operation.

In my device a new method is employed in the process of annealing and it differs from the old method in that the ware is taken hot from the mold set as close as practicable to the leer and transferred to a heat insulated chamber in a space of time short enough to prevent the cooling of the ware below a certain critical temperature at which annealing is impossible without reheating. In the leers in present use, including both the automatic and hand-fed types, the transfer of the ware from the molds to the heated chamber can not be accomplished in a space of time sufficiently short to prevent the setting or partial solidification of the thinner walls of the ware. Internal strains due to unequal contraction are thus produced and in order to remove these strains the ware must be again raised to a temperature at which the molecular structure may rearrange itself. When this transfer is made within a period of from two to four seconds, depending upon the thickness of the glass walls of the ware, it has been found possible to anneal the articles perfectly without the application of external heat and in much less time than by the old method. Furthermore better results are produced than those in leers now in use owing to the fact that there is an avoidance of the internal stresses in the glass walls due to too rapid cooling. As articles of pressed glass emerge from the molds hot enough to cohere if brought into contact with one another within a few seconds after their delivery such contacts must be avoided during this interval of time and this condition is fully met in the device herein described.

In the accompanying drawings, forming a part of this specification and in which similar characters of reference indicate like parts throughout the several views, Figure 1 is a vertical longitudinal section through the receiving chamber and transfer mechanism on the line 1—1 of Fig. 3. Fig. 2 is a horizontal section through the same parts on the line 2—2 of Fig. 3. Fig. 3 is an elevation of the receiving or front end of the leer. Figures 4ª to 4ᵉ, inclusive, show the elementary members of the mechanism for transferring the ware from the cross-conveyor to the main-conveyor at different stages of the operation in which it is understood that the numerical references in Fig. 4ª apply also to like parts in Figures 4ᵇ to 4ᵉ, inclusive. Fig. 5 is an enlarged diagrammatic side view of the carrier operating cams showing their relative angular positions on their shaft and the location of points on their working faces corresponding to certain positions of the carrier parts as shown consecutively in Figures 4ª to 4ᵉ, inclusive, and Fig. 6 is a side elevation of the complete leer in broken sections.

It is understood in this specification that the names of the various parts, when given in plural and followed by a single character of reference, will indicate that such parts are in pairs, one on either side of the leer and transversely opposite to one another and that they are similar in design and simultaneous in operation when referring to moving parts.

The receiving end of the leer and the transfer device 112 are placed in their relative working positions and as close as is practicable to the delivery mold 8 of the pressing machine and in working relation therewith.

The mechanism of the transfer device and the leer feeding mechanism are interconnected and are driven from a rotating part of the machine press which they serve, and they are speeded and timed in fixed relation to the operating cycle and rate of production of said press.

The details of the press and transfer device are not shown in the drawings nor described herein as one or more well known designs of these machines may work in conjunction with my leer mechanism. They may be located in different positions relative to the leer and their positions may be reversed without affecting the operation provided always that each piece of ware is deposited in its proper place and in proper time relation to the leer parts. The use of the initial heat leer and automatic feeding equipment herein described is obviously not restricted to the annealing of ware produced on pressing or blowing machines, and such articles as hand blown tumblers, glass chimneys and lamp shades may also be included in the application of the device.

The main body of the leer, as shown in Fig. 6, consists of the receiving and distributing chamber 1 and the cooling sections 2 and 3. The main-conveyor 4 is of the well known pan type and is driven continuously by the motor 5 through proper gearing at a speed in fixed relation to that of the feeding and distributing mechanism as hereinafter described. The walls of the receiving chamber 1 and those over the disk transfer 9 are made of refractory and heat-insulating materials of a thickness sufficient to reduce the heat radiation to any desired extent. The walls of section 2, Fig. 6, have less heat-insulating properties than those of the chamber 1; those of section 3 less than section 2, and so on, in any desired number of sections, gradually reducing the insulating properties of the walls as the discharge end of the leer is reached.

The vent flues 10, 11 and dampers 12, 13 provide for more rapid cooling by air circulation when necessary or desirable.

The chamber 1 and cooling sections 2, 3 are just large enough to house the conveyors and the largest size of the ware to be annealed so that the radiating surfaces may be kept at the minimum.

With the exception of the annular ware passage way over the disk 9 the receiving end of the leer is entirely enclosed, which is a necessary condition for leers of this class. A small gas burner, not shown, may be located at or near the entrance of the said annular passage under certain conditions or requirements.

The bottom member of the conveyor-seal 14 extends continuously between the side walls. The top of the casting 14 just touches the under side of the main-conveyor pans 4 and is rounded on the edge, as shown, in order that any warped pans may ride over it. In order to prevent cold air from entering the chamber over the main-conveyor 4 the top member of the seal 15 is made to fit closely over the conveyor pans and chains 31. This casting, extending between the side walls, has a small vertical travel and is loosely fitted under the rear end wall of the chamber. It is prevented from moving by friction with the main-conveyor by the upward extending flanges 16, 17, loosely engaging the bottom of the casting 18.

The wall sections 19, 20 are stationary but the section 21 is hinged on the pintle 22 and is free to swing outwardly without undue friction, as shown in the dotted lines in Fig. 2. If from any cause the ware should become clogged at the point of transfer from the disk to the fixed plate 46 the hinged section 21 is forced outward from the force derived from the conveyor, thus protecting the conveyor attachments against distortion and warning the attendant. The hinged section may also be opened by hand when desirable. The cap 23 over the receiving chamber is hung on the hinges 24 so that it may be swung upward in order to permit free access to the chamber. The eye-bolt 25 provides an attachment for lifting the cap on its hinges.

The combustion-chamber 26 is directly under the receiving-chamber and is separated therefrom by the baffle plate 27. This plate fills the entire horizontal area of the chambers with the exception of the throat 28 and prevents the short-circuiting of the hot gases through the main-conveyor pans. The lower run of the main-conveyor passes through the combustion-chamber directly under the baffle plate in order that the chains and pans may be quickly and thoroughly pre-heated by the burners 29. These burners, two in number, are placed at the rear end of the combustion chamber and directly under the main-conveyor chains in order that the heavy masses of the chains may be in the hot part of the flame and therefore become more quickly brought to an even temperature with the thin conveyor pans. The gas mixers 30 are placed on the outside of the rear wall and connected to the burners by pipes extending through the wall and the casting 14. Ignition of the gas is made through small doors near the burners.

The purpose of the burners is primarily to provide means for preheating the main-conveyor, cross-conveyor and carrier-plates as hot glassware is checked or cracked by contact with metal at a lower temperature. They are further useful as a means for making up the heat losses caused by unavoidable radiation from the chamber walls and for preheating the entire chamber and parts within after a shut-down. The heated products of combustion pass through the throat 28 to the top of the receiving-chamber and then to the cooling chambers where they are carried off by the flues 10, 11.

Under running conditions a large amount of heat is given off by the incoming ware and the gas consumption must be so restricted that the temperature of the receiving-chamber will at no time be higher than that of the incoming ware, this temperature being preferably about 700 degrees F., which is much lower than that of hot ware.

It is obvious that the dimensions of the chambers and the conveyors and carriers therein can be increased or diminished without in any way affecting the operation of the device or the method of its employment.

The disk transfer 9 is rotatably mounted under the semicylindrical extension of the front wall and inside the curved wall 20 and in the annular channel between said walls the ware is carried by the rotating disk to the interior of the chamber.

The two endless chains 31 run on the sprockets 32. These sprockets are keyed to the shaft 33 which is journaled at the ends to the bearings 34. These bearings are outside of the leer chamber and are attached to horizontal extensions on the cast iron table 58. Similar sprockets are keyed to the shaft 35 which is suitably journaled and is driven by the motor 5 through the gears 6, 7 and their intermeshing pinion and worm.

The upper or loaded run of the main-conveyor 4 is supported by the angle guides 36 and the lower run upon similar guide 37.

In the cross-conveyor the driven sprocket 39 and driver sprocket 40 are keyed to the vertical shafts 41, 42 respectively. The endless chain 43 running upon these sprockets is supported by the guides 44 which are preferably in the form of an integral casting. The chain is preferably of the roller type with offset links and has a pitch slightly greater than the diameter of the largest piece of ware to be carried by it. From each upper link extends the attachment 45 and from each lower link the attachment 45ᶜ. Below the sprocket 40 is the fixed plate 46 whose top surface is in line with that of the transfer disk 9, the said plate and disk being closely adjacent but not touching one another. The plate conforms to the circular path of the chain attachments at this point and terminates a short distance from the end of the carrier-plate 47.

The carrier-plate, lying under the lower chain attachments 45ᶜ and over the main-conveyor, is so positioned that the pieces of ware carried over the fixed-plate 46 by the chain attachments will be carried along in the same manner over the said carrier-plate. The outer edge of this plate, or that which is farthest from the chain 43, is slightly higher than the inner edge so that in passing over it the bottles or tumblers will lean slightly towards the chain, as shown in Figures 1 and 4. This inclination of the carrier-plate is just sufficient to cause the bottle or other article to remain by the action of gravity close to the chain while sliding over the plate. When the plate is advanced, however, in the manner hereafter described, the inclination is not sufficient to cause the articles to slide thereon by gravity and they consequently follow the plate in its advance movement.

The cast iron carrier-levers 48 are rigidly attached at their inner ends to the carrier-plate and are fulcrumed on the pins 70 to the lower ends of the swinging-links 49, 49ᵇ, 50, 50ᵇ which pass through slots in the plate 58. These levers pass through openings in the cast iron plate and front wall just large enough to receive them without binding. They are in double section inside of the leer chamber and up to their point of contact with the rollers 51, where the two arms or sections converge into the single section as shown in Fig. 1.

The outer ends of these levers bear upward, due to their unbalanced suspension, against the rollers 51 which are journaled in the swinging ends of the rocker-arms 52, 52ᵇ, 53, 53ᵇ. These arms are keyed to the secondary rocker-shaft 38 and the shaft is journaled in the bearings 54.

The rider-plate 55 is rigidly attached to the inner ends of the slides 56. These slides rest upon the shoes 57 and the latter rest slidably upon the cast iron table 58 which is rigidly bolted to the walls and to the iron structure of the leer. The outer ends of the shoes have laterally projecting lugs which bear upon the rollers 59. These rollers have a travel equal to half the travel of the slides and reduce the friction between the shoes and the table 58.

The slides 56 have a small longitudinal travel upon the shoes for a purpose which will be hereafter discribed. The inner ends of the springs 60 are attached to the slides and the outer ends to the upward extending lugs on the ends of said shoes, and their tension is adjustable by screws or other means.

The pins in the upper ends of the links 49, 49ᵇ, 50, 50ᵇ are tightly fitted in the links and loosely fitted in holes in the slides 56. The pins in the lower ends of these links are tightly fitted in the double arms of the levers 48 and loosely fitted in the links. The lower holes in the links are elongated as shown in Figures 4ᵃ to 4ᵉ so that the levers may be slightly raised with the links stationary.

The stabilizer-arms 61 are bifurcated at their lower ends to receive the inner ends of the shoes and slides and are fulcrumed to the shoes on the pins 62. The pins 63 are tightly fitted in the slides and loosely in the elongated holes in the stabilizer-arms. The L-shaped holder 64, extending across the interior of the chamber but free to move therein, is carried by the clamp arms 65 which are adjustable vertically in the slots in the upper ends of the stabilizer-arms to suit articles of variable heights.

The upwardly extending lugs 66 on the inner ends of the carrier-levers limit the backward travel of the rider-plate and slides relative to the carrier-plate and levers. The forward travel of the slides and rider-plate upon the shoes 57 is limited by the length of the clearance spaces 67, Figures 4ᵃ, 4ᵈ, 4ᶜ, between the eyes of the slides and the shoulders of the shoes. This forward travel of the slides on the shoes is sufficient to swing the stabilizer-arms inward and downward a distance sufficient to bring the holder 64 into contact with the ware at the beginning of the advance stroke of the carriers. The backward travel of the slides upon the shoes is limited by the upward projections 68, Figures 4ᵇ, 4ᶜ. The rollers 69 reduce the friction between the slides and their respective shoes.

The pins 70, passing through the carrier-levers and the swinging-links, as above described, pass also through the slots 71, Fig. 1, in the bearing brackets 72 and are limited by the length of these slots in their forward and backward travel.

The inner ends of the connecting-links 73, 73ᵇ, 74, 74ᵇ, are pivoted at the central points in the swinging-links 49, 49ᵇ, 50, 50ᵇ, respectively and the outer ends of these connecting-links are pivoted to the upper ends of the rocker-arms 75. These rocker-arms are keyed to the rocker-shaft 76 which is journaled in the bearings 92.

The cams 77, 78, 79, are keyed to the rotative shaft 80 in certain angular relations to one another which will be hereafter described. The double bell-crank rocker-arms 81, 82 are preferably made in an integral casting whose hub is keyed to the shaft 76. These arms carry the rollers 83, 84 which run on the faces of the cams 77, 78 respectively.

The rocker-arms 85, 86 are in the form of a bell-crank whose hub is journaled on the rocker-shaft 76. The arm 85 carries the roller 87 which runs on the face of the cam 79. The arm 86 is pivoted to the eye 88 of the connecting-rod 89. The ends of the connecting-rod are threaded right and left hand into the shanks of the eyes 88, 90 and held non-rotative by suitable clamp nuts, thus providing means for adjusting the length of the rod. The upper eye 90 is pivoted in the swinging end of the rocker-arm 91 whose hub is keyed to the shaft 38.

The cross-conveyor drive shaft 42 is keyed to the spur gear 93 which meshes in the pinion 94. This pinion is keyed to the intermediate shaft 95 and meshes also in the spur gear 96 which is keyed to the hollow disk shaft 113, Fig. 1. The bevel gear 97 is keyed on the shaft 95 and meshes in the bevel pinion 98 which is keyed to the drive shaft 99. The drive shaft is connected to some rotative part of the machine press and geared so as to have a certain speed ratio thereto so that the machine press and leer shafts will always be in correct time and speed relations with one another.

The drive shaft 99 is also keyed to the worm 100, and the worm wheel 101 is keyed on the cam shaft 80 so that the cams are always in correct time and speed relations to the other parts of the feeding mechanism.

The stationary receiving-plate 102 is attached to the front wall of the leer and is set in the narrow vertical clearance space between the disk 9 and the knock-off arm 103. This arm is tightly fitted to the top of the knock-off rocker-shaft 104 which is rotatably enclosed in the hollow shaft 113 carrying the disk. At the bottom of the knock-off shaft 104 is the tightly fitted cam lever 105 carrying at its swinging end the roller 106. This roller bears upon the wearing face of the knock-off cam 107 which is tightly fitted to the shaft 95 and is so designed that the knock-off arm will be actuated in time periods and directions corresponding to those of the transfer device, 112, and corresponding to the time required for the cross-conveyor to advance one pitch length, these time periods being in exact relation to the rate of production of the pieces of ware. The cam 107 is shown with four actuating projections arranged in quadrant spacing but a greater or less number of these may be used provided that the speed of the intermediate shaft 95 is varied accordingly. The angular travel of the knock-off arm 103 is just sufficient to push each piece of ware off of the plate 102 and the swinging end of the arm is concaved so that each piece of ware will be held to a circular path with constant radius on the plate 102. After the ware has been pushed off of the plate the receding stroke of the arm 103 is caused by the reaction of the spring 108, attached at one end to the cam lever 105 and at the other end to the leer structure.

In the construction of this leer and automatic feeder the plates for supporting and reinforcing the masonry, as well as those serving for supports for the moving members, are interconnected and firmly bolted together thus securing permanency of alignment and avoiding cracks in the masonry due to the expansion and contraction. The drawings show a leer where the ware enters at the left hand side but it is obvious that certain parts may be reversed thus constituting a right hand leer without in any way affecting the operation as herein described. As shown in Fig. 2 the disk 9 and the sprocket wheels 39, 40 have a clockwise rotation and the cam shaft 80 runs counter-clockwise as seen in Fig. 1.

The function of the transfer device, 112 is to grip each piece of ware as it is ready for delivery from the mold and carry it to the rotating disk at intervals of time above described. The position of the transfer arm when taking ware from the mold is shown by the broken line between the centers of the mold 8 and the transfer base, 112. From this position it swings in a horizontal plane in a circumferential path to the plate 102 where the ware is released. When the piece of ware is in position for delivery from the molds it is gripped by suitable tongs on the transfer arm. In order to secure free release at the receiving position at the leer each piece of ware must be set upon a stationary receptacle and this is provided by the plate 102. It is evident that other devices for transferring ware from the mold to the leer may be employed, for instance, each piece may be deflected to the disk 9 in a well known manner from an intermediate chain conveyor properly adapted therefor and properly heated. It is understood that the device for transferring the ware from the mold to the disk 9 must effect the transfer in a space of time not to exceed the time limit as herein set forth, such time limit being set at from one to three seconds, according to the size and wall thickness of the pieces of ware.

In operation the piece of ware, after having been pushed from the plate 102 to the disk 9, is carried by the disk until it comes in contact with a pair of the chain attachments 45, 45$^c$. From this point the bottle or other article is carried by the said attachments against the frictional resistance and across the face of the disk to the fixed-plate 46. During this time the bottle will be held against the chain by its friction with the disk which is almost directly across the path of the chain at the junction between the disk and the fixed plate, at which point the surface of the plate is slightly lower than that of the disk. The bottle is held in place between the chain attachments while on the plate 46 by the jointed curved guide 109, 109$^b$. The plate is parallel at its junction with the disk but from this point it is slightly twisted so that at its junction with the carrier-plate 47, which is slightly lower on the side nearest the chain, the top surfaces of the two members will be in line.

After being carried by the chain attachments to the carrier-plate the bottles remain between the attachments and close to the chain links by the action of gravity due to the slight inclination of the plate towards the chain, and, as the attachments 45 are directly over and at a considerable distance above the attachments 45$^c$, the latter being close to the plate, the possibility of the bottles toppling over sideways is avoided. The chain 43 is so speeded that it advances exactly one pitch length in the time corresponding to the rate of production, and the joint actions of the transfer device, the knock-off arm 103 and the disk 9 are so timed that each piece of ware will come into contact with the leading chain attachment over the disk while it is in about the position shown in Fig. 2. At the moment when the cross-row is completed, with a bottle in each of the pockets between the chain attachments over the carrier-plate and the chain in the position shown in Fig. 2, the projection on the face of cam 77 engages the roller 83 and through the rocker-arms 81, 75 and the links 73, 74, 49, 50, the carrier-levers 48, the shoes 57 and slides 56 advance into the leer chamber a fixed distance carrying with them the carrier-plate 47 and the rider plate 55 with the row of bottles resting upon the carrier-plate as shown in Fig. 4$^b$.

For purposes which will be hereinafter described the shoes 57 do not advance towards the leer chamber until the carrier levers and slides have advanced a short distance, corresponding to the length of the space 67, Fig. 4$^a$, the combined frictional resistance between the slides and shoes and the tension of the springs 60 being less than the frictional resistance between the shoes and the plate 58 upon which they slide.

At the beginning of this period of angular advance of the cams all of the carrier members are in the positions shown in Figures 1 and 4$^a$, with the roller 83 at the point $a$, the roller 84 at the point $a^1$ and the roller 87 at the point $a^3$ in Fig. 5. The surface of the cam 79 between the points $a^3$ and $b^3$ is cylindrical and concentric with the shaft so that there is no action in the roller 87 and its connections during this period of cam advance. It is evident that the roller 87 will always be held in contact with the cam 79 on account of the upward pull on the arm 86 due to the unbalanced condition of the carrier-levers 48.

The working surfaces on cam 77 from the points $b$ to $c$ and on cam 78 from $b^1$ to $c^1$, Fig. 5, are cylindrical and concentric with their shaft so that there is no action in the rocker-arms 81, 82 and their connected parts during this period of angular advance, but at the beginning of this period the roller 87 descends from the point $b^3$ to $c^3$ raising the rocker-arm 86, the connecting-rod 89, the rocker-arm 91 and the rollers 51 thus allowing the heavier inner ends of the carrier-levers 48 and the carrier-plate with the completed row of bottles to descend to the positions shown in Fig. 4$^c$. The working surface of the cam 77 between the points $c$ and $d$ is depressed towards the center a distance equal to half the radial increase between the points $a$ and $b$, and the surface on the cam 78 correspondingly rises an equal distance from the point $c^1$ to $d^1$. The surface of the cam 79 is cylindrical and concentric with the shaft from the points $c^3$ to $d^3$, consequently there is no action in the rocker-arms 85, 86 and their connections during this period of cam advance.

During the angular advance of the cams between the points $c$ to $d$, $c^1$ to $d^1$, $c^3$ to $d^3$, it will be seen that the rocker-arm 82 will be driven from and the arm 81 towards the center of the cams one half their full stroke and that the connected arm 75 and links 73 will have made a half stroke in recession. As there is a certain and considerable amount of frictional resistance between the shoes 57 and the plate 58 and as there is but little frictional resistance between the suspended carrier-levers 48 and their rubbing surfaces and pivots 70, it will be seen that the cam action from the points $c$ to $d$, $c^1$ to $d^1$ causes the carrier-levers and plate to recede their full original stroke while the shoes remain stationary and the slides and rider-plate recede a very short distance, equal to the length of the space 67. At the end of the above described half stroke in recession, with the cam rollers in the positions $d$, $d^1$, $d^3$, the carrier combination will be in the position shown in Fig. $4^d$ and the row of bottles will have been deposited upright on the main conveyor 4. At this juncture, during the recession of the carrier-plate, the row of bottles is held from following it, due to their friction therewith, by the edge of the rider-plate which during this part of the cycle is stationary.

Between the points $d$ and $e$ on cam 77 and between $d^1$ and $e^1$ on cam 78 the surfaces are cylindrical and concentric with the shaft so that there is no action in the rocker-arms 81, 82, 85 and their connections during this period of angular advance. From the point $d^3$ to $e^3$ on cam 79 the roller 87 is driven back to its original position, as at $a^3$, $b^3$, and the rocker-arms 52, 53 are depressed causing the inner ends of the carrier-levers and the carrier-plate to rise to their original positions. Between the points $e^1$ and $a^2$ on cam 78 the roller 84 is driven to its original position, as at $a^1$, and between the points $e$ and $a^1$ on cam 77 the roller 83 descends to its original position, as at $a$, thus completing their cycles of operation. During this period the rocker-arms 81, 82, 75 and the links 73, 74 recede the last half of their original stroke causing the shoes and rider-plate to recede their full stroke and all parts will be in their original positions shown in Fig. $4^a$. In this action the one or more pieces of ware, which have been carried on to the rider-plate during the first part of the cycle, are deposited in their regular positions on the carrier-plate and continue their advance thereon.

The radius of the cam 79 at the point $e^3$ is slightly less than at $a^4$ so that at $e^3$ the carrier-plate has not quite reached its highest point, as seen in Fig. $4^e$. But at $a^4$ the radius has gradually increased to that of the point $a^3$ so that at the completion of the cycle the carrier-plate will be in the position to receive the row of ware, as seen in Fig. $4^a$. The slightly lowered position of the carrier-plate as in Fig. $4^e$ is provided for so that the rider-plate may not be raised by the carrier-plate at this part of the cycle, which raising would impede the progress of the incoming ware from the fixed plate.

Referring to Fig. 5 it is evident that the angle between radial lines passing through the points $a$ and $b$ must equal the angle between radial lines passing through the points $a^1$ and $b^1$ as well as between $a^3$ and $b^3$, which may be termed homologous cam sectors, and that this is true also for each of the other homologous sectors. The angular measurements of each cam sector are predetermined to correspond to the selected time of duration of the respective cam actions and it is apparent that when the arms 81, 82 are in action the arm 85 is non-active and vice versa. The three cams must be in fixed angular relations to one another, as in Fig. 5, so that each action will begin and end at the proper time. The faces of the cams are cylindrical and concentric with their shaft from the points at which each cycle of operation ends until the beginning of the next cycle so that the cam operated members are at rest during this period of time.

Comparing Figures $4^a$ to $4^e$, inclusive, it is apparent that the rider-plate 55 is in the same position and inclination relative to the chain attachments in Figures $4^b$ to $4^e$, inclusive, as the exposed part of the carrier-plate 47 was at the beginning of the cam actions as in Fig. $4^a$, and that the bottles carried by the chain attachments along and on the rider-plate during the period of cam actions will remain thereon until the completion of the cycles as represented by the action from points $e$ to $a^1$, at which time the partial row of bottles on the rider-plate will drop to the carrier-plate. As the resultant actions from the cam 79 need not necessarily be exactly coincident with those of the other cams the angles between the various points on cam 79 may be varied somewhat, as for instance the carrier-plate may be slightly lowered while it is advancing from the points $a$ to $b$. The time duration of each cam action is preferably about half that of the rate of production of the ware so that the advance of the carrier-plate into the leer chamber, as from Fig. $4^a$ to $4^b$, takes place in the time and space interval between the bottles, thus avoiding interferences.

Both the carrier and rider-plates are made of thin metal in order to avoid the tendency of the bottles to tip forward, at the time when they are dropped from the rider- to the carrier-plate and from the latter to the main conveyor 4 as above described.

The operation of the stabilizer device will be understood by reference to Figures 1 and $4^a$ to $4^b$, inclusive. At the beginning of the cam action, as represented by Figs. $4^c$ to $4^d$, the slides 56 are drawn backward a short distance on the shoes as above described. This backward movement swings the arms 61 and L-shaped holder-bar 64 upward so that the row of bottles on the rider- or carrier-plates may pass freely thereunder. This position of the stabilizer parts is maintained until the cross-row is complete at which time the cam action begins. In the action from the position in Figs. 4ª to 4ᵇ the slide first moves on the shoe closing the space 67 and at the same time lowering the holder-bar 65 into contact with the bottles. The entire carrier and stabilizer mechanism then advances, with the parts in relatively fixed positions, to the position Fig. 4ᵇ, with the holder-bar still in contact with the bottles. When the holder-bar and its connected parts 56, 57 recede to their original positions as represented by the cam action from e to a¹, Fig. 5, and from Figs. 4ᵉ to 4ª, the vertical leg of the holder-bar clears the lowered row of bottles on the main conveyor and the incoming row is prevented from tipping forward from any cause by the said vertical leg. When such articles as tumblers, wide mouth bottles or other articles of medium stability are being annealed the stabilizer arms and holder-bar may be removed if desirable, without affecting the operation of the other parts of the leer, in which case, the slides and shoes may be rigidly attached to one another, constituting a single member.

The motor 5 is so geared to the main-conveyor drive shaft that the conveyor travels a distance equal to the largest diameter of the pieces of ware being annealed, plus a predetermined amount of clearance, in the interval of time corresponding to one revolution of the cam shaft 80. In order to vary the speed of the main-conveyor to suit the rate of production and size of the ware the motor is provided with any one of the well known speed regulators.

In case that the ware should accidentally clog while adjacent to the sprocket wheel 40 the outward pressure will force open the hinged wall section 21 carrying the curved guide 109ᵇ and the ware will be ejected through the opening and upon the table 58 until the fault is corrected by the attendant. The deflector 110 is hinged upon a vertical shaft extending upward through the cap 23 and is shifted to the position shown by the dotted lines in Fig. 2 by the detachable handle 111. This deflector is useful when from any cause it is desired to prevent the ware from engaging the attachments on the cross-conveyor.

Having thus described my invention I claim:

1. A leer comprising a practically enclosed receiving-chamber, a combustion chamber, a series of cooling chambers, a main-conveyor partly within said chambers, a cross-conveyor within said receiving-chamber, a horizontal transfer-disk adjacent to and in working relation to said cross-conveyor, a carrier-plate and a rider-plate adapted to deposit single cross-rows of ware upon the main-conveyor and means for actuating the said carrier-plate and rider-plate.

2. A leer comprising heat-insulated receiving- and cooling-chambers, a combustion-chamber, a main-conveyor partly within said chambers, a cross-conveyor, means for heating the enclosed conveyor and carrier parts, a horizontal rotative disk in working relation to the said cross-conveyor and means for conveying single rows of ware from the cross-conveyor and depositing them upon the main-conveyor.

3. A leer comprising interconnected receiving- and cooling-chambers, a combustion-chamber, a main-conveyor partly within said chambers, a horizontal rotative disk, a cross-conveyor within the receiving-chamber, in working relation to said disk, automatic means for moving the ware from the cross-conveyor to the main conveyor, means for heating the conveyors and other carrier parts within the combustion- and receiving-chambers and for maintaining a constant temperature in said receiving chamber, substantially as described.

4. In automatic leer feeding equipment the combination of a horizontal rotative disk partly within a heated chamber and adapted to receive and to carry hot ware into a receiving-chamber, a cross-conveyor within said receiving-chamber adapted to receive the ware from said disk and to distribute it in rows across the said chamber.

5. In automatic leer-feeding equipment the combination of a horizontal rotative disk adapted to carry hot ware from a point without to a point within a heated chamber, a fixed plate adjacent to and having its upper surface slightly lower than that of the disk, said fixed plate providing a sliding surface for the ware between the disk and a carrier plate, a cross-conveyor adapted to slide the ware over the said fixed plate and carrier-plate.

6. In automatic leer-feeding equipment the combination of a horizontal rotative disk, a cross-conveyor, a fixed plate adjacent to and in working relations to the disk and cross-conveyor, a carrier-plate adjacent to the fixed plate, a rider-plate slidably mounted on the carrier-plate, carrier-levers supporting the carrier- and rider-plates, and means for periodically actuating said carrier-levers, carrier- and rider-plates.

7. In automatic leer-feeding equipment the combination of a horizontal rotative disk and a fixed plate adjacent thereto, a carrier-plate adjacent to said fixed plate, a cross-conveyor positioned above the said disk, fixed plate and carrier-plate, carrier-levers supporting the carrier-plate, a rider-plate slidably mounted on the carrier-plate, shoes slidably mounted on a table, slides slidably mounted on said shoes, stabilizer arms pivoted at their lower ends to the shoes and slidably and pivotally attached to the slides and means for periodically actuating said shoes and slides.

8. In automatic leer feeding equipment the combination of a horizontal rotative disk, a fixed-plate set adjacent to said disk and adapted to receive ware deflected therefrom, a movable carrier-plate adapted to receive ware sliding from the said fixed-plate, a rider-plate above and in working relation to the carrier-plate, a cross-conveyor with attachments adapted for sliding the pieces of ware in a circular path on the fixed plate and in a straight path on the carrier-plate and rider-plate and means for periodically actuating the said carrier- and rider-plates, and a stabilizer above said plates as and for the purposes described.

9. In automatic leer feeding equipment the combination of a transfer disk, a fixed-plate adjacent to said disk, a guide around the said fixed-plate, a carrier-plate and a rider-plate adjacent to said fixed-plate, a cross-conveyor in working relation to each of said plates, a stabilizer and means for actuating the said carrier-plate, rider-plate and stabilizer in said combination in the manner described.

10. In automatic leer-feeding equipment the combination of a transfer disk, a fixed plate adjacent to said disk and in working relation thereto, a carrier-plate, a rider-plate, a cross-conveyor positioned above and having attachments for engaging pieces of ware and sliding them upon the fixed plate and carrier-plate, shoes slidably resting upon a fixed table, slides mounted upon the shoes, links pivoted at their upper ends to the slides and supporting at their lower ends carrier-levers pivotally attached and means for periodically actuating the shoes, slides and carrier-levers.

11. In automatic leer-feeding equipment the combination of a fixed table with shoes slidably resting thereon, slides mounted on said shoes, swinging links pivoted at their upper ends to the slides and at their lower ends to carry-levers, rollers in rolling contact with the top faces of the outer arms of the said carrier-levers, a carrier-plate rigidly attached to the inner arms of the carrier-levers, a rider-plate rigidly attached to the inner ends of the slides, means for imparting periodical horizontal reciprocal motions to the swinging links, shoes, and slides, and means for imparting vertical reciprocating periodical motion to said rollers.

12. In automatic leer feeding equipment the combination of a carrier-lever, a compound sliding member, swinging links supporting said carrier-lever from said sliding member, a roller journaled in vertically reciprocating mountings and contacting with the outer arm of said carrier-lever, a carrier-plate attached to the inner and heavier arm of said carrier-lever and a rider-plate attached to the inner end of said sliding member.

13. In automatic leer feeding equipment the combination of a carrier-plate attached to the inner ends of pendently supported carrier-levers, a rider-plate attached to the inner ends of slides, shoes between said slides and a fixed plate and in longitudinal slidable contact with both, pendent links pivoted at their upper ends to said slides and at their lower ends to said carrier-levers horizontally disposed links pivoted at one end to the pendent links and at the other end to driven slider rocker arms keyed to a rocker shaft, driving slider rocker arms keyed to said rocker shaft and having at their outer ends rollers engaging slider cams keyed to a rotating shaft, a lifting cam keyed to said rotative shaft and engaging a roller in a driven lifting rocker arm, a driving lifting rocker arm imparting vertically reciprocating motion to a secondary driven rocker arm keyed to a secondary rocker shaft, driven rocker arms keyed to the secondary rocker shaft and carrying at their swinging ends rollers engaging the outer ends of the said carrier levers.

14. In automatic leer-feeding equipment the combination of swinging carrier-levers supported from slides by pendent links, and rigidly attached to a carrier-plate, a rider-plate rigidly attached to a slide, a shoe in sliding contact between the slide and a fixed table, horizontal links connecting said pendent links to vertical slider driving rocker arms, driven slider rocker arms with rollers engaging slider cams and rigidly connected to said vertical slider driving rocker arms through a shaft, a driven lifting rocker arm engaging a lifting cam, a driving lifting rocker arm, a driven lifting rocker arm keyed to a secondary rocker shaft, and actuating said secondary rocker shaft through an arm mounted thereon and a connecting rod, driven lifting rocker arms keyed to said secondary rocker shaft and carrying rollers engaging the upper surfaces of the carrying-levers.

15. In automatic leer-feeding equipment the combination of swinging carrier-levers supported from sliding members and reciprocally actuated by swinging-links, a pair of cams actuating rocker-arms keyed to a common shaft and imparting horizontal motion, to and fro, through connecting-links to the said swinging-links, a cam actuating a bell crank which, through a connecting rod and a secondary rocker-shaft, is adapted to raise and lower the outer arms of the carrier-levers, said levers being so fulcrumed that the inner arms are the heavier.

16. In automatic leer feeding equipment the combination of a transfer disk, a stationary receiving-plate above said disk and outside the leer chamber, a knock-off arm above said receiving-plate and means for imparting a horizontal oscillatory motion at stated time periods.

17. In automatic leer feeding equipment the combination of a transfer disk mounted on a hollow shaft, a receiving-plate above the disk, a knock-off arm above the said plate and fixed to the end of a solid shaft within and concentric to the said hollow shaft, a roller arm keyed to the solid shaft, a cam engaging the roller in said arm and, a spring for imparting periodical rocking motion to the solid shaft and knock-off arm as and for the purpose described.

18. In automatic leer feeding equipment the combination of a stabilizer positioned over a cross-conveyor and a carrier-plate and comprising arms fulcrumed at their lower ends to shoes and pivoted at intermediate points to slides, said arms carrying at their upper ends vertically adjustable brackets which are rigidly attached to a holder-bar, the arms being actuated by the said shoes and slides in the manner and for the purpose described.

19. In automatic leer-feeding equipment a cross-conveyor having horizontally disposed sprocket wheels and having outwardly projecting chain attachments in combination with an inclined carrier- and rider-plate positioned below and in working relation to said chain attachments.

20. In automatic leer feeding equipment a swinging section of the side wall of a receiving-chamber adjacent to the receiving end of a cross-conveyor within said chamber said wall section being adapted to swing outward from the pressure exerted upon it by clogged ware in the manner described.

WILBUR S. MAYERS.